United States Patent [19]

Jones, Jr.

[11] Patent Number: 5,486,963
[45] Date of Patent: Jan. 23, 1996

[54] INTEGRATED TRANSDUCER-SUSPENSION STRUCTURE FOR LONGITUDINAL RECORDING

[75] Inventor: Robert E. Jones, Jr., San Jose, Calif.

[73] Assignee: International Business Machines Corporation, Armonk, N.Y.

[21] Appl. No.: 252,147

[22] Filed: Jun. 1, 1994

Related U.S. Application Data

[63] Continuation of Ser. No. 932,826, Aug. 19, 1992, abandoned.

[51] Int. Cl.$^6$ ............................ G11B 5/105; G11B 5/127
[52] U.S. Cl. .................................. 360/104; 360/126
[58] Field of Search .................................. 360/103, 104, 360/122, 125, 126, 97.01; 29/603

[56] References Cited

U.S. PATENT DOCUMENTS

| | | | |
|---|---|---|---|
| 3,849,800 | 11/1974 | Cuzner et al. | 360/97 |
| 4,190,872 | 2/1980 | Jones, Jr. et al. | 360/125 |
| 4,251,841 | 2/1981 | Jacobs | 360/122 |
| 4,320,427 | 3/1982 | Bogen | 360/125 |
| 4,558,385 | 12/1985 | Kaminaka et al. | 360/126 |
| 4,624,048 | 11/1986 | Hinkel et al. | 29/603 |
| 4,965,684 | 10/1990 | Stefansky | 360/97.01 |
| 5,041,932 | 8/1991 | Hamilton | 360/104 |
| 5,136,775 | 8/1992 | Onoe et al. | 360/122 |
| 5,198,948 | 3/1993 | Stover et al. | 360/126 |

*Primary Examiner*—John H. Wolff
*Assistant Examiner*—William R. Korzuch
*Attorney, Agent, or Firm*—Baker, Maxham, Jester & Meador

[57] ABSTRACT

A combination suspension and transducer magnetic head for longitudinal recording which can be used for contact recording and flying above the media. The transducer includes a horizontal first pole piece and a horizontal and vertical sectioned second pole piece. The magnetic gap is formed between the first pole piece and the vertical section of the second pole piece. The suspension layers are formed mainly from the insulation layer that separate the first horizontal pole piece and the horizontal section of the second pole piece, and an insulation layer that covers and protects the transducer layers. The layers of the combination head are deposited on a wafer in a row and column configuration. A release layer is deposited on the substrate first and then the individual thin film layers of the transducer are deposited. A horizontal first pole piece is formed. A horizontal section of a second pole piece is formed and activated by a conductor coil wound around the horizontal section. The backgap is displaced horizontally from the poletips. The wafer is then divided into rows. The vertical section of the second pole piece is formed on the end of the row in contact with its horizontal section. The substrate is removed by attacking the release layers.

9 Claims, 8 Drawing Sheets

INTEGRATED TRANSDUCER-SUSPENSION STRUCTURE FOR LONGITUDINAL RECORDING

This application is a continuation of application Ser. No. 07/932,826, filed Aug. 19, 1992, now abandoned.

DOCUMENTS INCORPORATED BY REFERENCE

Hinkel et al, U.S. Pat. No. 4,624,048, issued on Nov. 25, 1986 and assigned to the assignee of the present invention, to show a process for making magnetic head substrates useful with the present invention.

Cuzner et al, U.S. Pat. No. 3,849,800, issued on Nov. 19, 1974 and assigned to the assignee of the present invention, to show a rotary actuator useful in a drive using the present invention.

Jacobs, U.S. Pat. No. 4,251,841, issued on Feb. 17, 1981 and assigned to the assignee of the present invention, to show a wafer-substrate material useful with the present invention.

1. Technical Field

The present invention relates to moving magnetic storage devices and their recording elements and more particularly to transducer-suspension structures which are suitable for batch fabrication and a method for making the structures.

2. Background of the Invention

Moving magnetic storage devices, especially disk drives, are fast becoming the memory device of choice. This is due to their expanded nonvolathe memory storage capability together with a relatively low cost. Accurate retrieval of the stored information from these devices becomes critical, requiring the transducer to be positioned as close to the media as possible. Optimally, the transducer should touch the media.

Disk files are information storage devices which use at least one rotatable disk with concentric data tracks containing data information. A combination transducer-slider-suspension assembly includes a transducer for reading the data from or writing the data to the various tracks, a slider for holding the transducer adjacent to the track generally in a flying mode above the media, and a suspension for resiliently holding the slider and the transducer over the tracks. A positioning actuator connects to the combination to move the transducer to the desired track and maintains the transducer over the track center line during a read or a write operation. The transducer is attached to the air bearing slider which supports the transducer close to the track by a cushion of air that is generated by the rotating disk. However, the transducer may be placed in contact with the disk. The suspension provides a high spring stiffness and dimensional stability between the slider and the actuator arm. The suspension is required to maintain the transducer and the slider next to the data surface of the disk with as low a loading force as possible. The actuator is controlled for positioning the transducer over the correct track according to the data desired on a read operation or to the correct track for placement of the data during a write operation.

In conventional disk drives, the transducer and its slider are formed separately from the suspension and then attached through an operator controlled precision operation. The parts are small and the positioning of each relative to the other must be exact. The transducer must be exactly positioned over the track which in turn means that the suspension must be exactly positioned onto the slider. The suspension must provide flexibility and pitch and roll motion for the slider in the direction of motion of the rotating disk and yet provide resistance to yaw motion. Any error in the placement of the suspension on the slider is detrimental to performance and durability. Even if the suspension and the slider are correctly positioned, the conductor leads to the transducer must then be connected to the transducer. The conductor leads are generally directed along the suspension and connected to an amplifier placed on the suspension or the actuator. The conductor leads must not add to the spring stiffness of the slider while providing good electrical interconnection.

Generally, the conductor leads are bonded by soldering, for instance, to both the transducer output and the amplifier by an operator. Again, errors can cause destruction of the entire combination.

Contact or touching the media by the transducer/slider assembly or head presents unique problems in wear and the possibility of creating a "crash" of the media. To reduce the wear problem and "crash" potential, it has been recognized that the mass of the suspension system must be reduced to a minimum. Minimal mass optimizes any physical "impact" the head has upon the media and thereby reduces the possibility of damage and of wear.

To this end there have been disclosed a variety of mechanisms which use a "reed" approach to producing the transducer-suspension. Structured to work in a perpendicular recording environment, the reed device allows the head and suspension to be easily manufactured having: (i) precise throat height control, (ii) precise contact recording transducer placement or the formation of air bearings to achieve specified flying heights, (iii) bonding of sliders to suspensions, and, (iv) easy routing of conductor leads. Some structures, such as described in U. S. Pat. No. 5,041,932 to Hamilton, for example, have included a horizontal transducer with a horizontal first pole piece and a horizontal second pole piece which includes a vertical component that forms the magnetic gap in spaced relationship with the first pole piece.

As noted above, contact recording permits higher signals and greater resolution unregulated by variations in flying height. Unfortunately, the wear associated with contact recording, generally estimated to be 400 microinches over the file life, is usually not acceptable. Another major disadvantage is the fact that formerly this type of head was suitable only for perpendicular recording and was not suitable for longitudinal media. All of this has made the perpendicular recording head of the above design unsuitable for high density recording.

SUMMARY OF THE INVENTION

The present invention is a combination suspension and transducer magnetic head for longitudinal recording which can be used for contact recording or for flying above the media. The transducer includes a horizontal first pole piece and a horizontal and vertical sectioned second pole piece. The magnetic gap is formed between the first pole piece and the vertical section of the second pole piece. The pole pieces are shaped to avoid magnetic saturation and to provide narrow pole tips. The suspension is formed mainly from two layers. The first layer is an insulation layer that separates the first horizontal pole piece and the horizontal section of the second pole piece. The second layer is an insulation layer that covers and protects the transducer layers.

In the method of producing the combination transducer-suspension, a plurality of contact pads of patterned photoresist is formed on the substrate in a row and column configuration. A release layer is then deposited on the substrate. A first pole piece is pattern formed in partial contact on each contact pad. A thick backgap layer of magnetic material is deposited on each first pole piece. A wear-resistant layer followed by a thick layer of electrical and magnetic insulative material is deposited. This layer will become a major part of the suspension portion of the combination. This suspension film is lapped flat and an initial coil layer is formed on the suspension film for each pole piece. A second pole piece of magnetic layer is deposited for each first pole piece on an insulation layer at least partially covering the initial coil layer. An insulation layer covers the second pole piece layers, but permits contact to the initial coil layer. The coil circuit is then completed on this insulation layer along with conductor leads connected to the coil circuit. The conductor leads and subsequently deposited conducting studs provide the connection to the drive circuitry (not shown) for each transducer. A second thick layer of electrical and magnetic insulative material is then deposited to form the second and last major part of the suspension portion of the combination. A top portion of this film is lapped away to allow electrical contact to the studs previously formed. Since the combination assemblies are deposited on a wafer in rows and columns, each assembly is then divided into a plurality of rows of assemblies.

The end of the partial row assembly is polished and a magnetic gap layer is deposited. A contact via is then formed in the magnetic gap layer to expose the second pole piece layer. A third pole piece of magnetic material is pattern deposited over each row to form the vertical section of the second pole piece. A protective overcoat may then be deposited over the completed row of suspension and transducer assemblies. Then the row is divided into a plurality of individual combination structures. The substrate is next removed by dissolving or etching the release layer to leave a partially completed combination structure. The combination structure is completed by removing the portions of the gap, third pole piece and final protective layer which extend below the original contact pad. Preferably, the suspension is created using layers of deposited alumina ($Al_2O_3$). The desired structure of the suspension is formed by cutting the alumina layers and then separating the shaped suspension from the substrate surface. Removal of the substrate is preferably accomplished using a release layer.

Because the present invention provides a narrow gap between two magnetic poles on the contact pad surface, longitudinal recording is possible. This greatly enhances the applicability of the invention to applications which were previously beyond the scope of the prior art. Additionally, the mostly planar deposition arrangement for the present invention permits major processing of the assembly directly on a wafer surface. This greatly enhances the utility of the invention and allows batch production of the combination assembly.

Still another advantage of the present invention is the use of wear resistance material on the head structure. This protects the poletip regions of the head.

An object of the present invention, therefore, is to provide an enhanced magnetic moving storage device having a head structure that includes an enhanced suspension-transducer configuration.

Yet another object of the present invention is to create a transducer-suspension structure which is suitable for longitudinal recording.

It is another object of the present invention to make such a longitudinal head resistant to wear and to variations in contact pad contours.

BRIEF DESCRIPTION OF THE DRAWINGS

The foregoing, and other objects, features and advantages of the present invention will be apparent from the following more particular description of preferred embodiments of the invention, as illustrated by the accompanying drawings, wherein.

DETAILED DESCRIPTION OF THE PREFERRED EMBODIMENT

Figure 1:
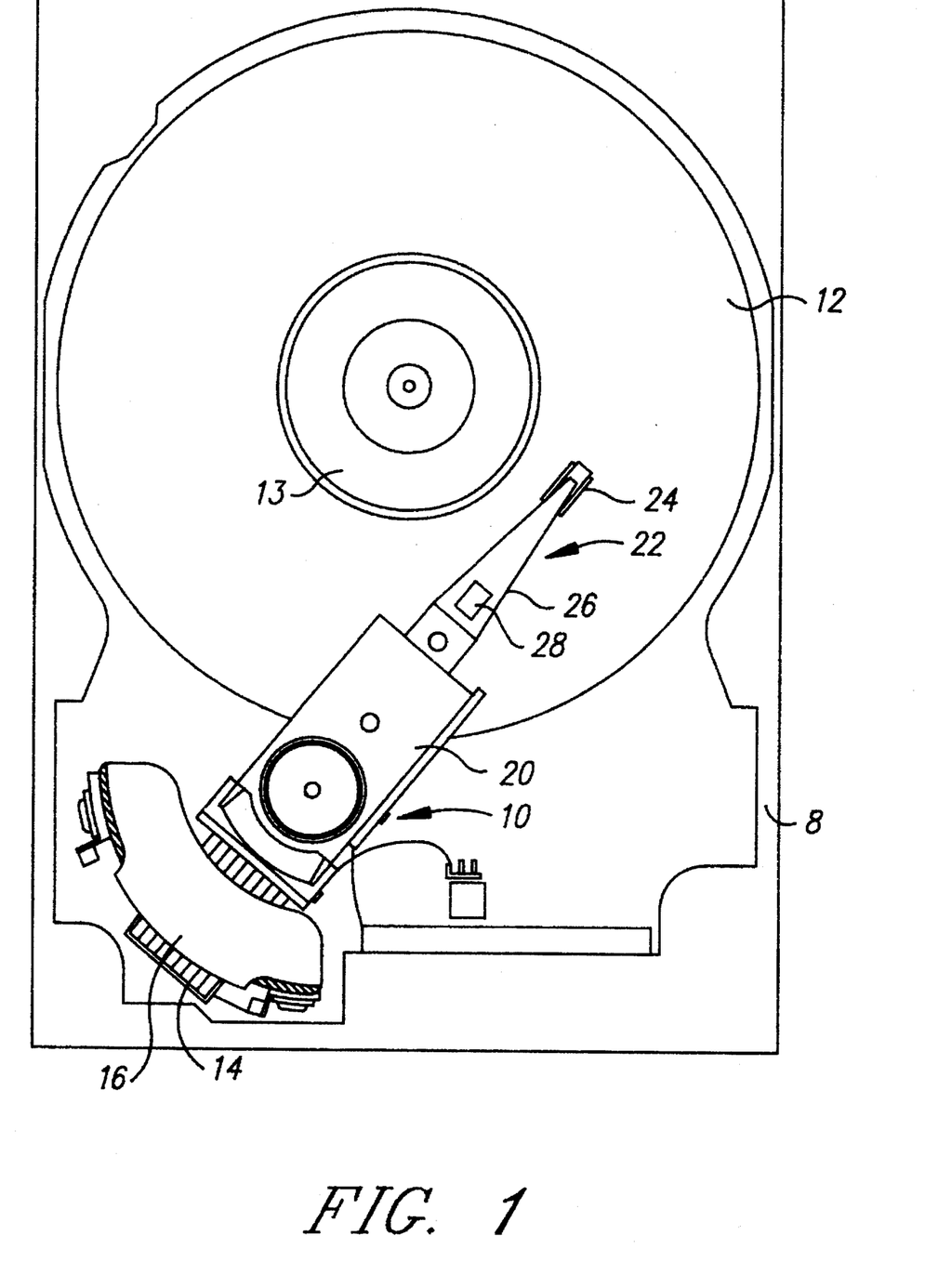
FIG. 1 is a top view of a magnetic recording mechanism employing the present invention of a combination assembly attached for positioning by a rotary actuator in transducing relationship to a disk surface of a disk file.

The preferred embodiments of the present invention are preferably for use in large multiple disk drives but should also find use in the single disk drives used generally for personal computers, or any other type of media drives such as tape drives. FIG. 1 illustrates a data recording disk file including a housing 8 in which is mounted a rotary actuator 10, an associated magnetic storage disk 12 and a drive means 13 for rotating the disk 12. The rotary actuator 10 moves a combination assembly of the present invention in an arcuate path over the disk 12. The rotary actuator 10 includes a voice coil motor, which comprises a coil 14 movable within the magnetic field of a fixed permanent magnet assembly having a core 16. An actuator arm 20 is attached to the movable coil 14. The other end of the actuator arm 20 is attached to a combination transducer-suspension assembly 22 of the present invention and produced according to the procedure setforth herein. The combination assembly 22 includes a transducer-slider segment 24 and a suspension section 26. The suspension section 26 can support the transducer-slider segment 24 above the surface of the disk 12 on a bearing or cushion of air generated by the rotation of the disk 12. Preferably, the suspension section 26 supports the transducer-slider segment 24 in contact with the surface of disk 12. The air bearing or air bearing surface refers to the surface of the transducer parallel and adjacent to the disk surface. It includes both configurations where the transducer is designed to fly above the disk, and where the transducer is designed to contact the recording media, the disk 12, during operation. The actuator arm 20 can include a plurality of arms with each arm supporting its own combination assembly 22, each combination assembly 22 associated with each surface of the disks located in the data recording disk drive assembly. Therefore, for instance, the disk 12 can also have a combination assembly 22 mounted to the actuator arm 20 for association with the media surface on the underside of the disk 12. Further, other combination assemblies are associated with the top and bottom sides of other disks which may be included in the disk drive assembly, the transducer access of which is controlled by the actuator 10.

The suspension section 26 of the combination transducer-suspension assembly 22 provides a load to the transducer-slider segment 24 which is generally perpendicular to the surface of the disk 12. This perpendicular load maintains the transducer-slider segment 24 on or above the data surface of the disk 12. During rotation of the disk 12 by the drive means 13, the combination assembly 22 remains in contact with the disk 12 for reading or recording data. Alternatively, the combination assembly 22 can be designed to fly above the disk 12 using the lift or upwards force generated between the transducer-slider segment 24 and the disk 12 to oppose the perpendicular load applied to the transducer-slider segment 24 by the suspension section 26. Contact recording is the preferred embodiment of the present invention.

During operation, the transducer-slider segment 24 is moved to the desired track of the concentric data tracks on the data surface of the disk 12 by means of the coil 14, which moves within the magnetic field of the magnet assembly. Rapid movement of the transducer-slider segment 24 from one track to another track is required. It is necessary that the transducer of the segment 24 be properly positioned over the desired track in a minimum amount of time. A rotary actuator for use with the present invention is shown in the aforementioned U.S. Pat. No. 3,849,800. It should be noted that while the actuator 10 illustrated in FIG. 1 is a rotary actuator, other types of conventional disk files use linear actuators which can be used with the present invention.

The suspension section 26 of the combination assembly 22 must provide radial stiffness, and have substantial flexibility in the pitch and roll directions as it holds the transducer of the segment 24 above the data surface of the disk 12. If desired, an integrated circuit assembly 28 may also be produced on the suspension section 26 of the combination assembly 22. The integrated circuit amplifier is shown symbolically as reference numeral 28. An enlarged configuration of the combination assembly 22 of FIG. 1 is shown in FIG. 2.

Figure 2:
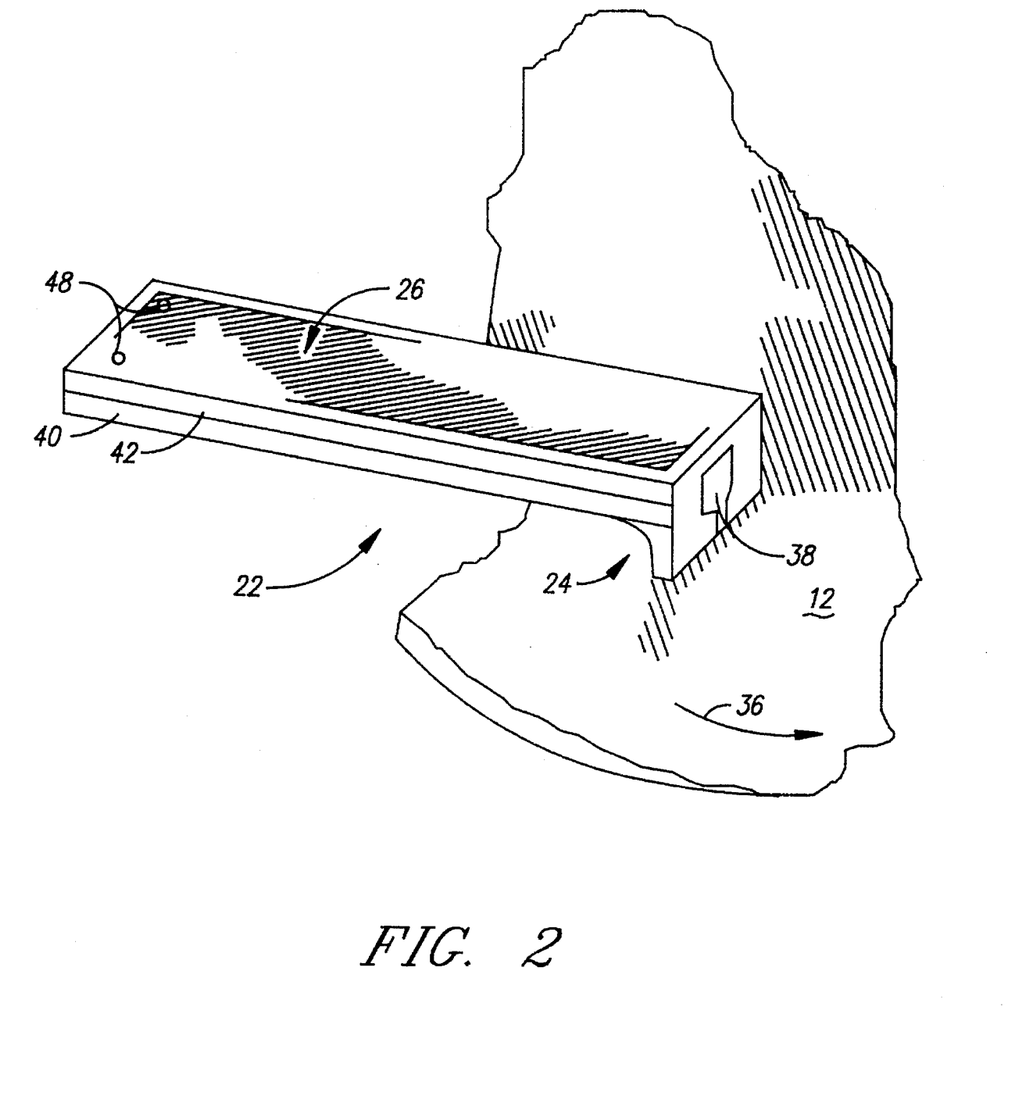
FIG. 2 is a perspective view of a combination transducer-suspension assembly produced according to the present invention for use with the disk drive as illustrated in FIG. 1.

Referring now to FIG. 2, wherein like numerals denote like features and structural elements in the various figures. The combination assembly 22 is shown positioned over the disk 12. The rotation of the disk 12 is indicated by an arrow 36. A transducer 38 of the transducer-slider segment 24 (vertical pole section shown) is positioned adjacent the disk 12 for reading and writing magnetic transitions onto the disk 12. The horizontal transducer-suspension of the present invention refers to the location of the transducer-suspension parallel to the disk 12 and is for ease of presentation of the invention since most disk drives have their disk mounted horizontally. It should be obvious that vertically mounted disks are equally covered and in that configuration, the 'horizontal' and 'vertical' units would be reversed but the transducer still operates parallel to the disk surface.

The suspension section 26 suspends the transducer 38 over the disk 12. The suspension section 26 in this embodiment includes a first insulation layer 40 and a second insulation layer 42. A conductive circuitry layer (not shown) is encapsulated between these layers. The bulk of the support provided by the suspension section is maintained by the first and second insulation layers 40 and 42. The transducer 38 is electrically connected to the conductor circuitry layer. Electrical connection conductor pads 48 are provided to interconnect with an amplifier which can be located adjacent thereto. An integrated circuit amplifier (not shown) could be provided in place of the conductor pads. The deposited integrated circuit amplifier 28 of FIG. 1 is an example of a potential placement of an amplifier.

The insulation layers 40 and 42 provide electrical insulation between the conductor layer and the possibly conductive magnetic portions of the transducer 38. The two insulation layers 40 and 42 provide the suspension support which holds the transducer 38 in position over a track of the disk 12.

Figure 3:
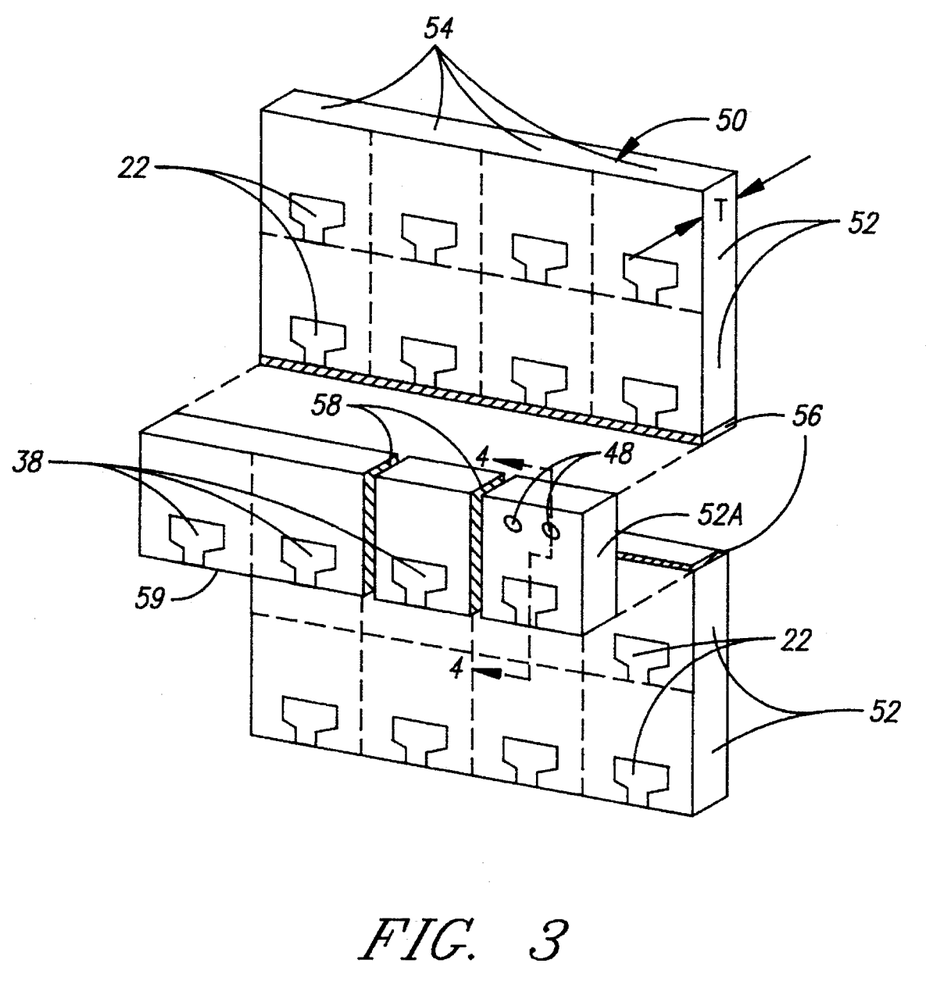
FIG. 3 is a perspective view of a substrate with a plurality of structures formed thereon in rows and columns for use in the process to build the combination assembly as shown in FIG. 2.

FIG. 3 illustrates the steps in the method of forming the combination assembly 22 according to the configuration as shown in FIG. 2. The batch fabrication of the combination assembly 22 is accomplished by preparing a non-magnetic wafer substrate 50. The substrate 50 has a thickness T which must be sufficient to support the structures during the processing. A plurality of the combination assemblies 22 is deposited onto the substrate 50 in a row and column configuration. Each row 52, five shown, and each column 54, four shown, delineate the formation of the combination assemblies 22 into a plurality of rows which can then be further separated into the individual units. More or less than the number of rows 52 and columns 54 shown in FIG. 3 can be produced on a single wafer substrate 50. The number is dependent on the size of the wafer and on the size of the individual combination assemblies.

Figure 4:
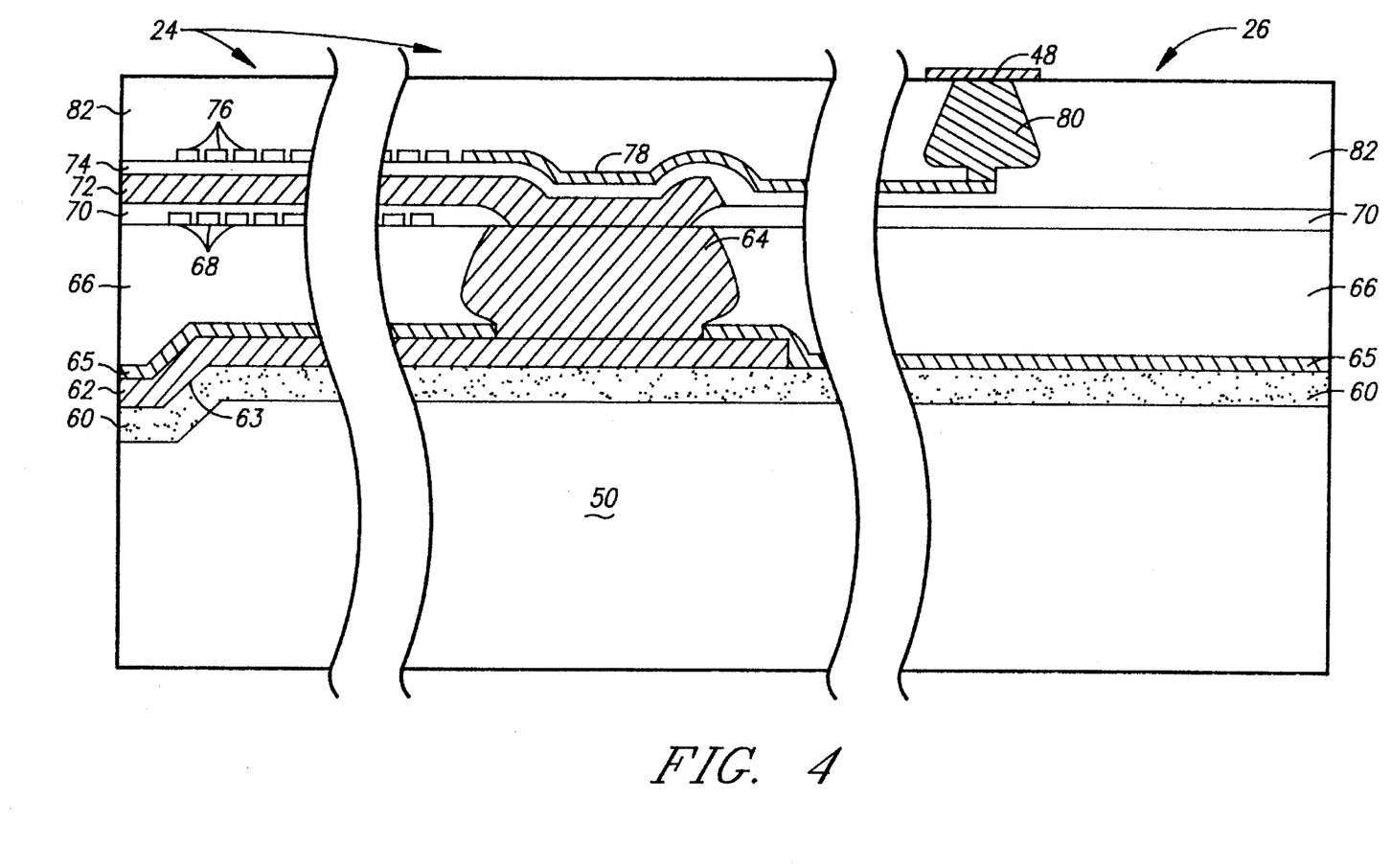
FIG. 4 shows a cross sectional view taken along lines 4—4 of FIG. 3.
Figure 5:
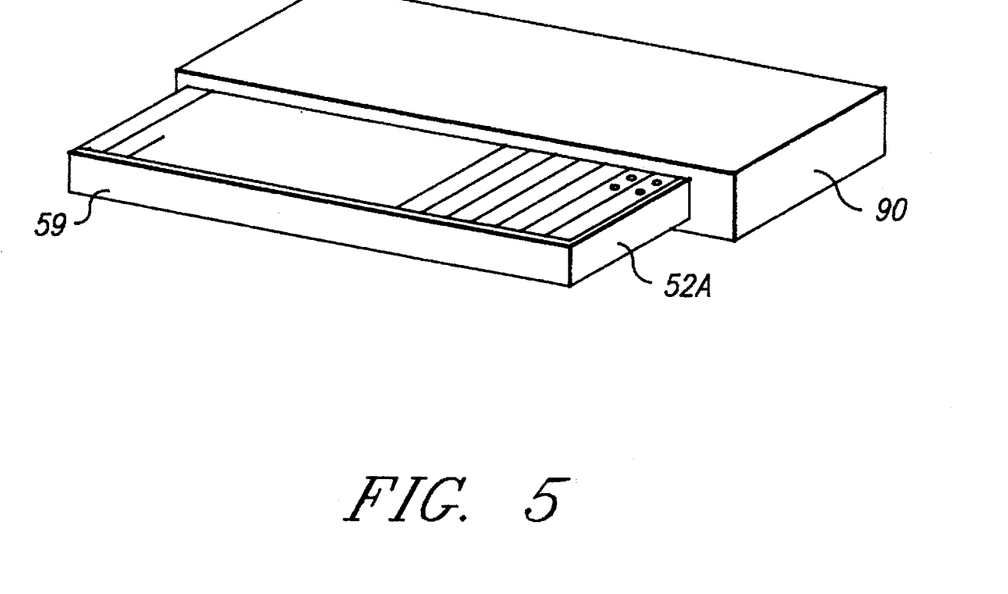
FIG. 5 is a perspective view of a row of structures taken from the substrate of FIG. 3 and mounted for further processing.
Figure 6A:
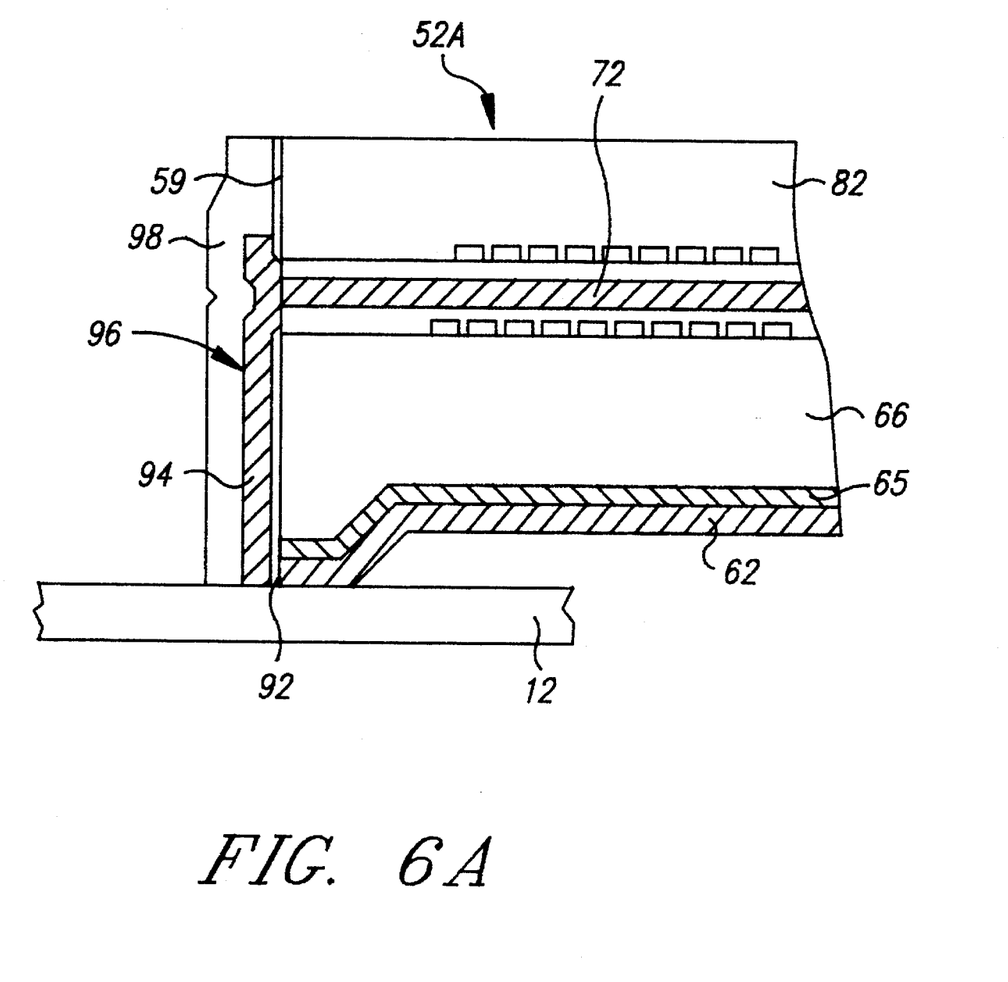
FIGS. 6A and 6B are cross sectioned views of embodiments of the transducer according to the present invention.
Figure 6B:
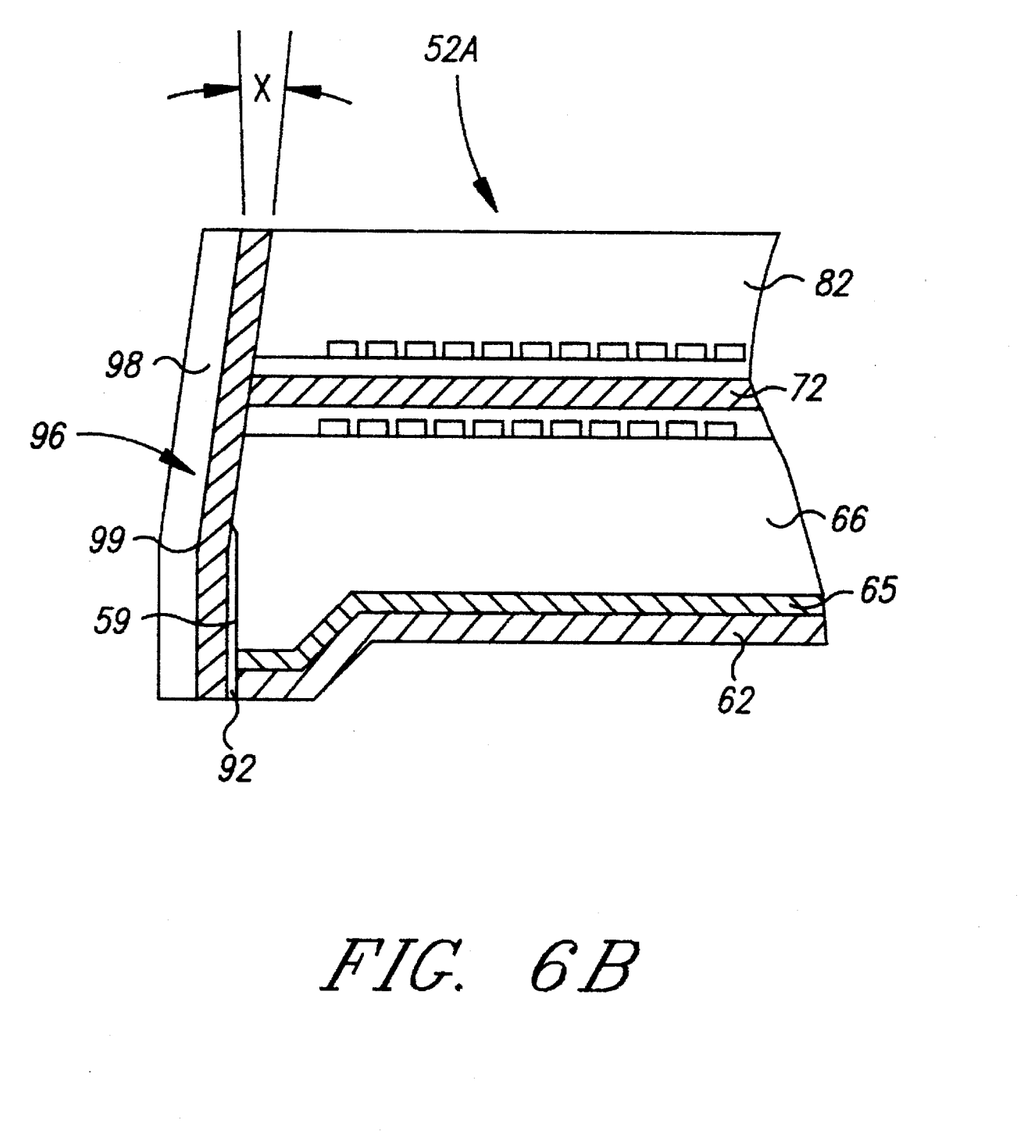

Still referring to FIG. 3, one row 52A is separated from the wafer 50 by saw cuts 56, for instance. The row 52A has its transducer segments 38 at an end surface 59. The row 52A undergoes further processing as shown in FIGS. 5 and 6 and then is separated into the individual units by saw cuts 58 or otherwise dicing, as shown in FIG. 3. FIG. 4 shows the cross sectioned view of the layers deposited on the wafer 50 to provide the first part of the combination assembly 22.

Referring now to FIG. 4, the combination assembly 22 includes a plurality of layers that form the transducer-slider segment 24 and the suspension section 26. In the cross sectional view, the horizontal transducer contemplated in the present invention forms the whole or at least a part of the transducer-slider segment 24 of FIGS. 1 and 2. The transducer includes a first pole piece 62 placed horizontal, that is, parallel, to the contact surface of a magnetic disk (not shown). The first pole piece 62 is formed with a sloping contact region 63 that could be produced by molding the original substrate 50 surface as shown in FIG. 4. The surface of the wafer substrate 50 is coated with a release layer 60 before the deposition of the material that produced the pole piece 62. The wafer substrate 50 and the pole piece 62 are separated later in the process by dissolving the release layer 60. A magnetic member 64 is deposited in contact with the pole piece 62. After magnetic member 64 is formed, the entire release layer 60 surface of the wafer substrate 50 is coated with a layer of a wear-resistant material 65 and an insulating layer 66. The wear-resistant layer 65 covers most of the contact area between the transducer section 24 and the disk 12 (see FIG. 2). The wear-resistant layer 65 and the insulation layer 66 are lapped flat after deposition to provide a smooth surface for the subsequent layers and to expose the top surface of the member 64. A first set of conductor stripes 68 for the transducer coil is then formed on the insulation layer 66 and coated with a coil insulation layer 70 of an electrically insulating material. A horizontal portion 72 of a second pole piece is then formed on the insulating layer 70. The second pole piece horizontal portion 72 contacts the member 64 to complete a back gap for the transducer. An additional layer of a coil insulation layer 74 is deposited over the entire surface of the wafer. A second set of coil conductor stripes 76 is deposited on the coil insulation layer 74. The second set of coil conductor stripes 76 interconnects with the first set of conductor stripes to provide the activating conductor coil around the horizontal portion 72 of the second pole piece of the transducer section 24. The coil formed by the conductor stripes 68 and 76 are electrically connected to a conductor layer 78 deposited on the conductor coil insulating layer 74. This coil, together with the magnetic members of the transducer, permits the transducer to read and write magnetic transitions on the disk 12. The signals sensed by the coils are directed by the conductor layers to circuitry (not shown) via a conductor stud 80 shown formed at the free end of the conductor layer 78. A second electrical insulation layer 82 is deposited over the conductor coil stripes 76 and the conductor layer 78. This second insulation layer 82 and the first insulation layer 66 are the support structure of the suspension section 26. The conductor pads 48 (see FIG. 2) are then formed on the second insulation layer 82 in contact with the conductor studs 80. The conductor pads 48 interconnect with the circuitry of its associated disk drive, possibly through integrated circuit 28 as shown in FIG. 1.

After completion of the deposition process as shown in FIG. 4, the wafer 50 is cut into rows, see FIG. 3. In FIG. 3, the row 52A is separated from the wafer substrate 50 by the saw cuts 56. The row 52A is then fastened by an adhesive, for instance, to a transfer tool 90, see FIG. 5, with the end surface 59 of the row 52A exposed. The end surface 59 of the row 52A is then lapped flat. The further processing of the transducer is shown in FIG. 6A for one embodiment.

Referring now to FIG. 6A, the end surface 59 of the row 52A is lapped flat and a magnetic gap layer 92 is formed. The end of the horizontal part 72 of the second pole piece is exposed and a vertical part 94 is deposited. The second pole piece shown by reference number 96 includes its horizontal part 72 and its vertical part 94. The transducer section 24 then includes the second pole piece 96 together with the magnetic gap 92 and, see FIG. 4, the first pole piece layer 62 and the magnetic member 64. After completion of the vertical part 94, a protective layer 98 is deposited. This now completes the formation of the row 52A and the row is ready to be divided into individual combination assemblies 22, see FIG. 2, for use with the disk 12. As shown in FIG. 3, the saw cuts 58 separate the row 52A containing a plurality of completed transducers into the individual units. A second type of vertical part for the second pole piece 96 is shown in FIG. 6B.

Referring now to FIG. 6B, the magnetic gap layer 92 is again first deposited on the end surface 59 of the row 52A. The magnetic gap layer 92 is then lapped at an angle X from the vertical to expose the end of the horizontal part 72 of the second pole piece. A layer of magnetic material is deposited to form vertical part 99. The second pole piece shown by reference number 96 includes the horizontal part 72 and the vertical part 99. The transducer section 24 thus includes the second pole piece 96 together with the magnetic gap 92, the first pole piece layer 62, and the magnetic member 64. After completion of the vertical part 99, the protective layer 98 is deposited as previously stated. Similarly as discussed with FIG. 6A and FIG. 3, the formation of the row 52A is now completed and the row is ready to be divided into individual combination assemblies 22.

Referring again to FIG. 4, the completed combination assembly 22 including the transducer section 24 and the suspension section 26 is separated from a substrate 50 by dissolving the release layer 60. The release layer 60 can be a plated copper. Another possible release layer material is tungsten. Removal of the copper release layer is readily accomplished using ammonia persulfate, for instance, which does not attack the alumina generally used in the process for providing the transducers. Once the combination assembly has been so manufactured, its incorporation into a rigid disk reader system is easily accomplished and is obvious to those of ordinary skill in the art.

Figure 7:
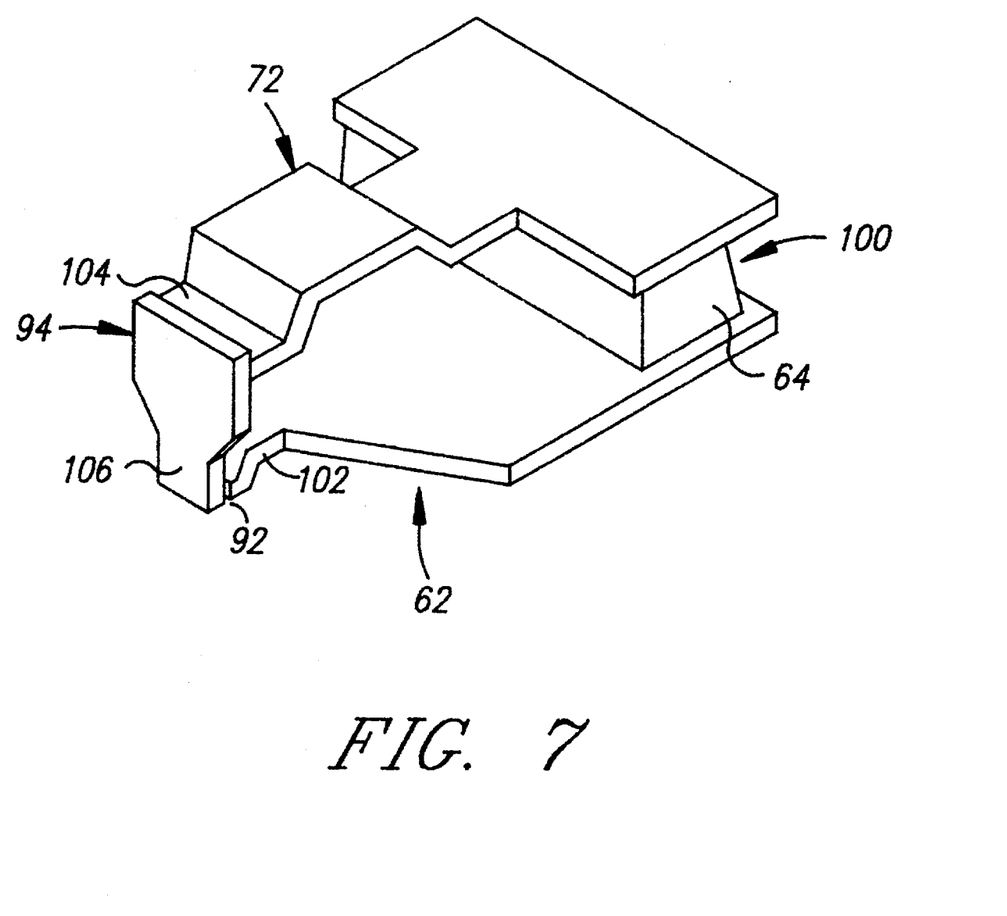
FIG. 7 is a perspective view of the transducer of the present invention without the insulation and conductor layers.

The wafer substrate 50 can be any suitable material known to those in the art. There is no requirement that the wafer be alumina-titanium-carbide or silicon. The release layer 60 can, for instance, be an electrically conductive material and thereby serve as a seed or plating base layer for the subsequently deposited layers such as the first pole piece layer 62 of the transducer. The electrically conductive material is preferably plated copper but could be gold or other suitable conductor. The conductor leads 78 are routed along the suspension portion 26 to the conductor stud 80. The conductor leads are configured into a stripline arrangement of two flat thin leads since the suspension portion 26 is thin and the stress symmetry required is compatible with a stripline design. The suspension section 26 is preferably produced by depositing alumina for the first and second insulating layers 66 and 82. Standard stud and pad technology is used to produce the conductor stud 80 and pad 48 to complete the thin film transducer-suspension assembly as known in the art. A thick deposition of alumina can be used to encapsulate the transducer with the protective layer 98. A thin layer of alumina, For instance, can form the magnetic gap 92. Permalloy, for instance, can be the magnetic material that forms the pole piece portions of the transducer. The shape of the transducer pole pieces are shown in FIG. 7. The coils and conductors are not shown to provide a view of the preferred shape of the magnetic portions of the transducer of this invention.

Referring now to FIG. 7, the preferred embodiment of the present invention includes a transducer that incorporates the advantages of the transducer shown in the Jones, Jr. et al, U.S. Pat. No. 4,190,872, issued on Feb. 26, 1980 and assigned to the assignee of the present invention. The transducer includes the first pole piece layer 62 magnetically connected to the horizontal portion 72 of the second pole piece at a back gap 100 through the magnetic member 64. The vertical portion 94 of the second pole piece is magnetically connected to its horizontal portion 72 and is separated from the first pole piece 62 by the magnetic gap 92. The first pole piece has a wider width at the back gap 100 than at its pole tip 102. Similarly the horizontal portion of the second pole piece has a wider width at the back gap 100 than its end 104 that connects to the vertical portion 94. The vertical portion 94 also has a wider width at its end that connects to the pole piece 72 at the end 104 than its pole tip 106. The preferred shape of the transducer as shown in FIG. 7 provides a narrow pole tip structure while avoiding saturation of the magnetic force along the pole pieces.

While the invention has been particularly shown and described with reference to preferred embodiments thereof, it will be understood by those skilled in the art that various changes in form and detail may be made therein without departing from the spirit and scope of the invention. For instance, the transducer may be produced onto the wafer in the form as is described in U.S. Pat. No. 4,190,872 for the preferred embodiment, but other configurations could be used without departing from the present invention. The wafer may be made of material such as is the subject matter of the Jacobs U.S. Pat. No. 4,251,841, entitled "Magnetic Head Slider Assembly" and assigned to the assignee of the present invention. The suspension section according to the preferred embodiments could be a dual layer of a polyimide material and a metal layer deposited thereon to provide sufficient resiliency and stiffness as required by a suspension assembly. It should be noted that the suspension assembly could be produced in a single layer if the correct thickness and stiffness were obtainable in the single layer. It is also well understood that many electrically conductive materials are available to form the conductive circuitry and the transducer leads. Copper or gold is the preferred material but many others are available as is well known in the art. While air bearing suspensions are discussed herein, the present invention also includes contact recording in which the suspension places the transducer in contact with the media during operation. The invention claimed herein is set forth in the following claims.

What is claimed is:

1. A combination thin film magnetic head transducer and suspension system for longitudinal recording comprising:

a horizontal thin film first pole piece having a pole tip;

a substantially vertical thin film magnetic gap layer having oppositely facing first and second substantially vertical thin film surfaces;

the first and second vertical thin film surfaces being made by a process of thin film deposition without lapping;

the first thin film surface of the thin film magnetic gap layer directly contacting the pole tip of the horizontal thin film first pole piece;

a thin film second pole piece having a vertical component which has a pole tip directly contacting the second vertical thin film surface of the thin film magnetic gap layer and a horizontal component magnetically isolated from but adjacent and parallel to said first pole piece said first and second pole pieces magnetically connected at a back gap region and magnetically isolated at their pole tips by said magnetic gap;

a thin film coil electrically isolated from but magnetically activating said first and second pole pieces and encircling the horizontal component of said second pole piece;

said first and second pole pieces configured with a wider surface at their backgap region and narrower surfaces at their pole tips;

a suspension layer of a thin film layer of a resilient material at least covering said second pole piece horizontal component and electrically and magnetically isolated from said second pole piece and said coil, said resilient material extending beyond the back gap region;

the pole tip of the first pole piece being horizontal and substantially perpendicular to the vertical component of the second pole piece;

the first pole piece having a downwardly sloping portion which is adjacent to the pole tip of the first pole piece;

the first pole piece narrowing in width from said sloping portion to the pole tip; and the vertical component of said second pole piece having an essentially vertical portion on an end adjacent to said magnetic gap layer and having a portion on a second end which is angled away from the essentially vertical portion to contact the horizontal component of said second pole piece.

2. A disk drive assembly comprising:

a housing a rigid platter mounted in said housing having means for storing data in tracks provided thereon;

means for rotating said rigid platter in said housing;

an actuator arm positioned in said housing and operable to place a free end in proximity to one track of said rigid platter;

means for positioning said actuator arm adjacent to a particular track on said rigid platter;

a combination thin film magnetic head transducer and suspension system for longitudinal recording mounted to the free end of said actuator arm and including:

a horizontal thin film first pole piece having a pole tip;

a substantially vertical thin film magnetic gap layer having oppositely facing first and second substantially vertical thin film surfaces;

the first and second vertical thin film surfaces being made by a process of thin film deposition without lapping;

the first thin film surface of the thin film magnetic gap layer directly contacting the pole tip of the horizontal thin film first pole piece;

a thin film second pole piece having a vertical component with a pole tip directly contacting the second vertical thin film surface of the thin film magnetic gap and a horizontal component magnetically isolated from but adjacent and parallel to said first pole piece, said first and second pole pieces magnetically connected at a back gap region and magnetically isolated at their pole tips by said magnetic gap;

said first and second pole pieces configured with a wider surface at their backgap region and narrower surfaces at their pole tips;

a thin film coil electrically isolated from but magnetically activating said first and second pole pieces and encircling the horizontal component of said second pole piece; and a suspension layer of a thin film layer of a resilient material at least covering said second pole piece horizontal component and electrically and magnetically isolated from said second pole piece and said coil, said resilient material extending beyond the back gap region;

the pole tip of the first pole piece being horizontal and substantially perpendicular to the vertical component of the second pole piece;

the first pole piece having a downwardly sloping portion which is adjacent to the pole tip of the first pole piece; and the vertical component of said second pole piece having an essentially vertical portion on an end adjacent to said magnetic gap and having a portion on a second end which is angled away from the essentially vertical portion to contact the horizontal component of said second pole piece.

3. A thin film magnetic head for longitudinal recording comprising:

a horizontal thin film first pole piece having a pole tip;

a thin film second pole piece having a horizontal component and a substantially vertical component, the vertical component having a pole tip opposite the pole tip of the first pole piece;

a substantially vertical thin film magnetic gap layer having top and bottom portions;

the bottom portion of the vertical thin film magnetic gap layer being sandwiched between the pole tip of the first pole piece and the pole tip of the vertical component of the second pole piece;

the bottom portion of the vertical thin film magnetic gap layer having first and second thin film surfaces the first and second thin film surfaces being made by a process of thin film deposition without lapping;

the first thin film surface of the bottom portion of the vertical thin film magnetic gap layer directly engaging the pole tip of the first pole piece and the second thin film surface of the bottom portion of the vertical thin film magnetic gap layer directly engaging the pole tip of the vertical component of the second pole piece;

the second pole piece having an angled portion which is integral with the vertical component of the second pole piece, the angled portion angling from the vertical component and making direct engagement with an exposed end of the horizontal component of the second pole piece; and, the exposed end of the horizontal component of the second pole piece having been exposed by a process of lapping the top portion of the vertical thin film magnetic gap layer.

4. A thin film magnetic head for longitudinal recording comprising:

a horizontal thin film first pole piece having a pole tip;

a thin film second pole piece having a horizontal component and a substantially vertical component, the vertical component having a pole tip opposite the pole tip of the first pole piece;

a substantially vertical thin film magnetic gap layer having top and bottom portions;

the bottom portion of the vertical thin film magnetic gap layer being sandwiched between the pole tip of the first pole piece and the pole tip of the vertical component of the second pole piece;

the bottom portion of the vertical thin film magnetic gap layer having first and second thin film surfaces, the first and second thin film surfaces being made by a process of thin film deposition without lapping;

the first thin film surface of the bottom portion of the vertical thin film magnetic gap layer directly engaging the pole tip of the first pole piece and the second thin film surface of the bottom portion of the vertical thin film magnetic gap layer directly engaging the pole tip of the vertical component of the second pole piece;

the top portion of the thin film magnetic gap layer having an aperture opposite an end of the horizontal component of the second pole piece; and the vertical component of the second pole piece being connected to the end of the horizontal component of the second pole piece through said aperture.

5. A thin film magnetic head for longitudinal recording comprising:

a horizontal thin film first pole piece having a pole tip;

a thin film second pole piece having a horizontal component and a substantially vertical component the vertical component having a pole tip opposite the pole tip of the first pole piece;

a substantially vertical thin film magnetic gap layer having top and bottom portions;

the bottom portion of the vertical thin film magnetic gap layer being sandwiched between the pole tip of the first pole piece and the pole tip of the vertical component of the second pole piece:

the bottom portion of the vertical thin film magnetic gap layer having first and second thin film surfaces, the first and second thin film surfaces being made by a process of thin film deposition without lapping;

the first thin film surface of the bottom portion of the vertical thin film magnetic gap layer directly engaging the pole tip of the first pole piece and the second thin film surface of the bottom portion of the vertical thin film magnetic gap layer directly engaging the pole tip of the vertical component of the second pole piece;

the first pole piece and the horizontal component of the second pole piece being magnetically connected at a back gap;

a thin film suspension of resilient material covering the first pole piece and the horizontal component of the second pole piece between the vertical thin film magnetic gap layer and the back gap and continuing a distance past the back gap away from the first pole piece and the horizontal component of the second pole piece;

the thin film magnetic gap layer having an aperture opposite an end of the horizontal component of the second pole piece; and the vertical component of the second pole piece being connected to the end of the horizontal component of the second pole piece through said aperture.

6. A disk drive including the thin film magnetic head for longitudinal recording of claim 5, the disk drive including:

a housing;

means mounted in the housing for rotating a magnetic disk;

an actuator mounted in the housing; and the thin film suspension being mounted on the actuator so that the pole tips of the first and second pole pieces can be placed in a transducing relationship with respect to the magnetic disk.

7. A thin film magnetic head for longitudinal recording comprising:

a horizontal thin film first pole piece having a pole tip;

a thin film second pole piece having a horizontal component and a substantially vertical component the vertical component having a pole tip opposite the pole tip of the first pole piece;

a substantially vertical thin film magnetic gap layer having top and bottom portions;

the bottom portion of the vertical thin film magnetic gap layer being sandwiched between the pole tip of the first pole piece and the pole tip of the vertical component of the second pole piece;

the bottom portion of the vertical thin film magnetic gap layer having first and second thin film surfaces, the first and second thin film surfaces being made by a process of thin film deposition without lapping;

the first thin film surface of the bottom portion of the vertical thin film magnetic gap layer directly engaging the pole tip of the first pole piece and the second thin film surface of the bottom portion of the vertical thin film magnetic gap layer directly engaging the pole tip of the vertical component of the second pole piece;

the first pole piece and the horizontal component of the second pole piece being magnetically connected at a back gap;

a thin film suspension of resilient material covering the first pole piece and the horizontal component of the second pole piece between the vertical thin film magnetic gap layer and the back gap and continuing a distance past the back gap away from the first pole piece and the horizontal component of the second pole piece;

the second pole piece having an angled portion which is integral with the vertical component of the second pole piece, the angled portion angling from the vertical component and making direct engagement with an exposed end of the horizontal component of the second pole piece; and the exposed end of the horizontal component of the second pole piece having been exposed by a process of lapping the top portion of the vertical thin film magnetic gap layer.

8. A thin film magnetic head for longitudinal recording as claimed in claim 7 including:

the pole tip of the first pole piece being horizontal and substantially perpendicular to the vertical component of the second pole piece; and the first pole piece having a downwardly sloping portion which is adjacent to the pole tip of the first pole piece.

9. A disk drive including the thin film magnetic head for longitudinal recording of claim 8, the disk drive including:

a housing;

means mounted in the housing for rotating a magnetic disk;

an actuator mounted in the housing; and the thin film suspension being mounted on the actuator so that the pole tips of the first and second pole pieces can be placed in a transducing relationship with respect to the magnetic disk.

* * * * *

UNITED STATES PATENT AND TRADEMARK OFFICE
CERTIFICATE OF CORRECTION

PATENT NO. : 5,486,963
DATED : January 23, 1996
INVENTOR(S) : Jones, Jr.

It is certified that error appears in the above-indentified patent and that said Letters Patent is hereby corrected as shown below:

Column 9, line 40, insert --,-- after "piece".

Column 12, line 45, insert --,-- after "component".

Signed and Sealed this

Twenty-third Day of July, 1996

Attest:

BRUCE LEHMAN

*Attesting Officer*  *Commissioner of Patents and Trademarks*